(12) United States Patent
Braun et al.

(10) Patent No.: US 6,429,550 B1
(45) Date of Patent: Aug. 6, 2002

(54) POLARITY REVERSAL PROTECTION CIRCUIT FOR A FINAL ELECTRONIC POWER STAGE

(75) Inventors: Peter Braun; Robert Kern, both of Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,709

(22) PCT Filed: Sep. 3, 1999

(86) PCT No.: PCT/DE99/02814

§ 371 (c)(1),
(2), (4) Date: Jul. 27, 2000

(87) PCT Pub. No.: WO00/14847

PCT Pub. Date: Mar. 16, 2000

(30) Foreign Application Priority Data

Sep. 4, 1998 (DE) .......................................... 198 40 300

(51) Int. Cl.$^7$ ................................................. H02B 1/24
(52) U.S. Cl. ...................... 307/127; 307/10.7; 307/112; 307/125; 361/18; 361/56; 361/58; 361/245
(58) Field of Search ................................ 307/127, 10.7, 307/125, 112; 361/77, 84, 245, 18, 56, 58

(56) References Cited

U.S. PATENT DOCUMENTS 4,139,880 A * 2/1979 Ulmer et al. ................. 361/246
5,519,557 A * 5/1996 Kopera et al. ................. 361/84
5,764,465 A * 6/1998 Mattes et al. .................. 361/77

* cited by examiner

Primary Examiner—Ronald W. Leja
Assistant Examiner—Robert L. Deberadinis
(74) Attorney, Agent, or Firm—Kenyon & Kenyon

(57) ABSTRACT

A polarity reversal protective circuit for an electronic power output stage that can be driven via a drive circuit is described. In the case of an incorrect polarization of a supply voltage, power FETs are used in at least one supply terminal to interrupt a connection of the wrongly applied supply voltage to the drive circuit and the power output stage. A definite polarity reversal protection is obtained using a circuit that is improved with respect to cost and space requirement. A single N-channel power FET is looped, with its source-drain path, into the positive supply terminal of the supply voltage. The source terminal of the N-channel power FET is connected with the positive supply terminal. The gate terminal of the N-channel power FET is connected to a collector of a PNP transistor, which is additionally connected to an output of the drive circuit via a current-limiting resistor. An emitter of the PNP transistor is connected—via a diode that is conductive when the supply voltage is wrongly applied—to the positive supply terminal. The base of the PNP transistor is connected—via a base resistor—to a negative (ground) supply terminal of the supply voltage.

2 Claims, 1 Drawing Sheet

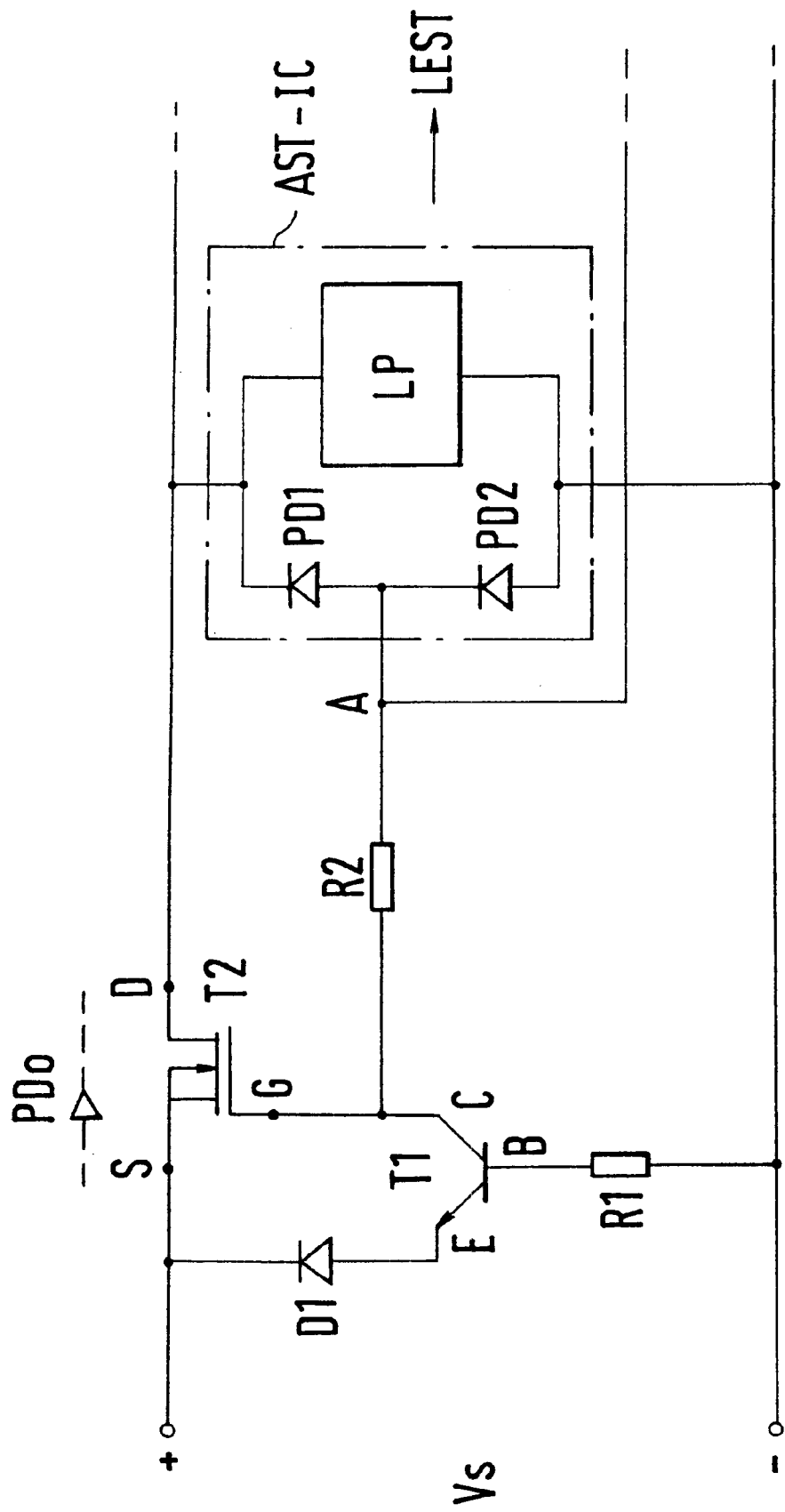

POLARITY REVERSAL PROTECTION CIRCUIT FOR A FINAL ELECTRONIC POWER STAGE

FIELD OF THE INVENTION

The present invention relates to a polarity reversal protective circuit for an electronic power output stage that can be driven via a drive circuit, in which, in case of incorrect polarization of a supply voltage, power FETs are used in at least one supply terminal to interrupt a connection of the incorrectly applied supply voltage to the drive circuit and the power output stage.

BACKGROUND INFORMATION

A polarity reversal protective circuit of this sort is necessary because the electronic components of the drive intergrated circuit (IC) with the charge pump, and the power circuit position switch, can be destroyed if the polarization of the supply voltage is wrong.

It is conventional to loop a diode into a supply terminal of the supply voltage. This diode must be matched to the power of the power circuit position switch, and causes an additional power loss. If the supply voltage is applied with the wrong polarity, the diode receives current in the blocking direction, and thus prevents a flow of current via the drive IC and the power output stage.

The series circuit of a diode and the winding of a switch-off relay has also been connected between the supply terminals. In this context, the diode is looped in so that it becomes conductive when the polarity of the supply voltage is incorrect, so that the operating current for the relay can flow. The connection to the drive IC and to the power output stage is interrupted via relay contacts. A disadvantage of this polarity reversal protective circuit is the space requirement and the vibration sensitivity of the relay. This is particularly unacceptable for a space-saving construction of an electronic power output stage for supplying loads in motor vehicles.

In a conventional electronic polarity reversal protective circuit, in the positive supply terminal of the supply voltage, two N-channel power FETs are connected in series with their source-drain paths, the source terminals being connected with one another. The one drain terminal is connected to the positive supply terminal, and the other drain terminal leads to the drive IC and the power output stage. The gate terminals of the two N-channel power FETs are connected in parallel, and are driven by the output of a charge pump. This polarity reversal protective circuit requires two expensive N-channel power FETs, and still has twice the power loss in the direction of connection. However, given incorrect polarization of the supply voltage one of the N-channel power FETs is always blocked in order to protect the drive circuit and the power output stage.

SUMMARY OF THE INVENTION

An object of the present invention a polarity reversal protective circuit of the type mentioned above having few space-saving elements, so that it is economically advantageous and guarantees clear polarity reversal protection with a low power loss.

This object is achieved in that a single N-channel power FET is looped, with its source-drain path, into the positive supply terminal of the supply voltage the source terminal (S) being connected with the positive supply terminal, and in that the gate terminal of the N-channel power FET is connected with the collector of a NPN transistor, which is additionally connected to the output of the drive circuit via a current-limiting resistor, and in that the emitter of the NPN transistor is connected—via a diode that is conductive when the supply voltage is incorrectly applied—to the positive supply terminal, and the base of the NPN transistor is connected—via a base resistor—to the negative (ground) supply terminal of the supply voltage.

This polarity reversal protective circuit requires only a single N-channel power FET, which trips fully when the supply voltage is correctly applied and has a very low power loss. The second, expensive N-channel power FET is replaced with the NPN transistor, the diode and the base resistor, i.e. with three small-signal components, and when the polarization of the supply voltage is incorrect a definite blocking of the N-channel power FET looped into the positive supply terminal is achieved. In relation to the conventional polarity reversal protective circuit having two N-channel power FETs, this is advantageous not only in terms of cost and space requirement (with respect to surface), but also from a technical point of view, e.g. lower voltage drop.

According to another embodiment, the drive circuit is fashioned with a charge pump as an IC.

BRIEF DESCRIPTION OF THE DRAWINGS

The Figure shows a polarity reversal protective circuit according to the present invention.

DETAILED DESCRIPTION

Supply voltage Vs is connected with the positive pole to positive supply terminal + and with the negative (ground) pole to negative supply terminal −. An N-channel power FET T2 is looped, with its source-drain path S-D, into positive supply. Source Terminal S is connected with positive supply terminal +. Drive circuit AST-IC and power output stage LEST is disconnected at drain terminal D. Negative supply terminal − is switched through smoothly and leads directly to drive circuit AST-IC and to power output stage LEST, which, according to the power requirement, can be constructed, for example, as a simple switching stage, a half-bridge circuit or a full-bridge circuit.

N-channel power FET T2 must be matched, in the conducting direction, to the required power of power output stage LEST. The driving of N-channel power FET T2 is sufficient, since this produces only low power loss in the conducting direction.

If, however, supply voltage Vs is applied to the supply terminals with the wrong polarity, then the driving of N-channel power FET T2 does not take place. If drive circuit AST-IC is fashioned with a charge pump LP as an IC, then output A of drive circuit AST-IC is connected with the supply lines via parasitic diodes PD1 and PD2.

In order to prevent the flow of current in the reverse direction, N-channel power FET T2 is blocked when supply voltage Vs is wrongly applied. For this purpose, a NPN transistor T1 is provided that becomes conductive and that applies gate terminal G of N-channel power FET T2 to source via diode D1, so that N-channel power FET T2 is switched off.

Emitter E of NPN transistor T1 is connected with the negative potential at positive supply terminal + via diode D1, which is conductive in this direction, so that NPN transistor T1 becomes conductive and applies gate terminal G of N-channel power FET T2 to source via diode D1.

Current can thus no longer flow in the opposite direction to drive circuit AST-IC and power output stage LEST via N-channel power FET T2, so that a definite polarity reversal protection is provided. Diode D1 is also required, because the allowable negative blocking voltage of NPN transistor T1 from base B to emitter E is mostly smaller than required supply voltage Vs that is applied.

Without diode D1, NPN transistor T1 and base resistor R1, parasitic diode PD2 would become conductive to ground, and would drive gate terminal G of N-channel power FET T2 conductive, so that the polarity reversal protective function would not be provided. This flaw is removed by the introduction of these three small-signal components. It is true that the omission of the second N-channel power FET, which would otherwise be required, is achieved at the cost of introducing these three elements. However, this is preferable in terms of cost and space requirement, as well as technically.

What is claimed is:

1. A polarity reversal protective circuit for an electronic output stage drivable by a drive circuit, power FETs being used in at least one supply terminal to interrupt a connection of a wrongly applied supply voltage, comprising:

a n-channel power FET having a source terminal, a gate terminal and drain terminal, the N-channel power FET being looped with a source-drain path of the N-channel power FET into a positive supply terminal of a supply voltage, the source terminal being coupled to the positive supply terminal; and a NPN transistor having a collector, a base, and an emitter, the collector being coupled to the gate terminal of the N-channel power FET, the collector being further coupled via a current-limiting resistor to an output of a drive circuit, the emitter being coupled via a diode to the positive supply terminal of the supply voltage, the diode being conductive when the supply voltage is incorrectly applied, the base being coupled via a base resistor to a negative supply terminal of the supply voltage.

2. The circuit according to claim 1, wherein:

the drive circuit is an integrated circuit having a charge pump.

* * * * *